US011740862B1

(12) United States Patent
Morsy et al.

(10) Patent No.: US 11,740,862 B1
(45) Date of Patent: Aug. 29, 2023

(54) METHOD AND SYSTEM FOR ACCELERATED DECOMPOSING OF AUDIO DATA USING INTERMEDIATE DATA

(71) Applicant: ALGORIDDIM GMBH, Munich (DE)

(72) Inventors: Kariem Morsy, Munich (DE); Maximilian Mumme, Munich (DE); Hendrik Nöller, Munich (DE); Federico Tessmann, Munich (DE)

(73) Assignee: ALGORIDDIM GMBH, Munich (DE)

( * ) Notice: Subject to any disclaimer, the term of this patent is extended or adjusted under 35 U.S.C. 154(b) by 0 days.

(21) Appl. No.: 17/992,468

(22) Filed: Nov. 22, 2022

(51) Int. Cl.
*G06F 3/16* (2006.01)
*G10H 1/00* (2006.01)
*G06F 16/632* (2019.01)

(52) U.S. Cl.
CPC .......... *G06F 3/165* (2013.01); *G06F 16/632* (2019.01); *G10H 1/0008* (2013.01); *G10H 1/0041* (2013.01); *G10H 2210/056* (2013.01); *G10H 2210/125* (2013.01); *G10H 2240/141* (2013.01); *G10H 2250/235* (2013.01); *G10H 2250/311* (2013.01)

(58) Field of Classification Search
CPC .......... G06F 3/165; G06F 16/632; G06F 3/16; G10H 1/0008; G10H 1/0041; G10H 2210/056; G10H 2210/125; G10H 2240/141; G10H 2250/235; G10H 2250/311; G10H 1/00
See application file for complete search history.

(56) References Cited

U.S. PATENT DOCUMENTS

| 10,887,033 | B1 * | 1/2021 | Tessmann | ............ | G10H 1/0008 |
| 11,347,475 | B2 * | 5/2022 | Morsy | ................... | G10L 21/043 |

(Continued)

FOREIGN PATENT DOCUMENTS

| AU | 2020432954 A1 * | 3/2022 | ........... | G06F 3/0482 |
| EP | 3054449 A1 * | 8/2016 | ............. | G06F 3/165 |

(Continued)

OTHER PUBLICATIONS

Prétet et al., "Singing Voice Separation: A study on training data", HAL Open Science, Nov. 20, 2019, 6 pages.

(Continued)

*Primary Examiner* — Jeffrey Donels
(74) *Attorney, Agent, or Firm* — Kilpatrick Townsend & Stockton LLP

(57) ABSTRACT

A method for processing audio data, comprising providing song identification data identifying a particular song from among a plurality of songs or identifying a particular position within a particular song, loading intermediate data associated with the song identification data from a storage medium or from a remote device. The method also comprises obtaining input audio data representing audio signals of the song as identified by the song identification data. The audio signals comprise a mixture of different musical timbres, including at least a first musical timbre and a second musical timbre different from said first musical timbre. The method comprises combining the input audio data and the intermediate data with one another to obtain output audio data. The audio data represent audio signals of the first musical timbre separated from the second musical timbre.

27 Claims, 6 Drawing Sheets

(56) References Cited

U.S. PATENT DOCUMENTS

Figure 1:
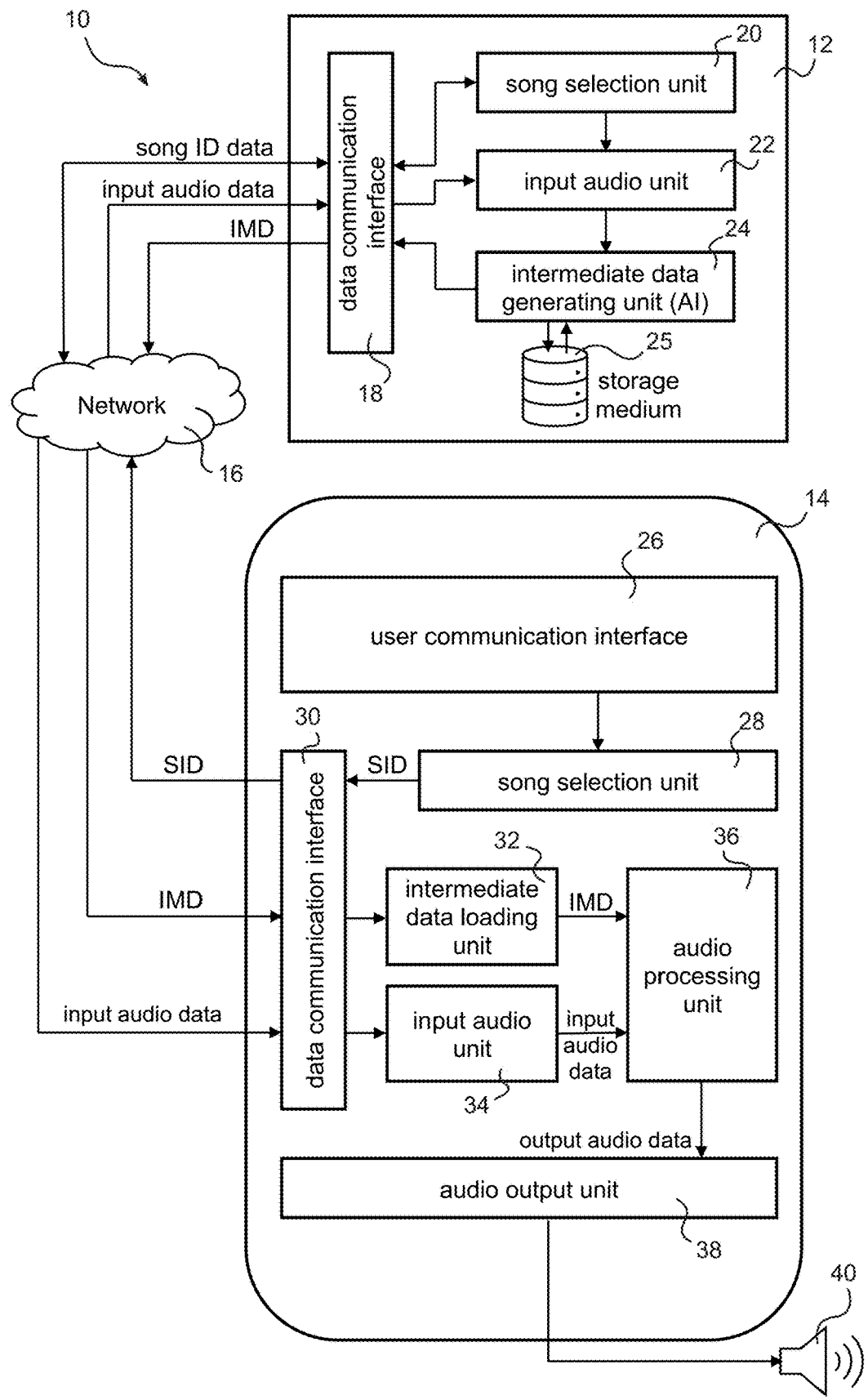

| | | | |
|---|---|---|---|
| 11,475,867 B2* | 10/2022 | Bosch Vicente | G10H 1/0008 |
| 11,488,568 B2* | 11/2022 | Morsy | G10H 1/46 |
| 2008/0190271 A1* | 8/2008 | Taub | G10H 1/0058 |
| | | | 84/645 |
| 2010/0057734 A1* | 3/2010 | Miyajima | G06F 16/683 |
| | | | 707/E17.014 |
| 2015/0278686 A1* | 10/2015 | Cardinaux | G06F 3/165 |
| | | | 706/22 |
| 2018/0005614 A1* | 1/2018 | Vilermo | G10H 1/46 |
| 2018/0167726 A1* | 6/2018 | Bohrarper | H04N 21/44016 |
| 2018/0247625 A1* | 8/2018 | Shi | G10H 1/40 |
| 2020/0042879 A1* | 2/2020 | Jansson | G10L 21/028 |
| 2020/0043517 A1 | 2/2020 | Jansson | |
| 2020/0159490 A1* | 5/2020 | Cardinaux | G10L 15/16 |
| 2021/0294567 A1* | 9/2021 | Morsy | G11B 27/105 |
| 2021/0326102 A1* | 10/2021 | Morsy | H04R 3/12 |
| 2021/0390938 A1* | 12/2021 | Morsy | G06F 3/0482 |
| 2022/0101869 A1* | 3/2022 | Wichern | G10L 25/30 |
| 2022/0386062 A1* | 12/2022 | Morsy | H04S 1/002 |
| 2023/0040657 A1* | 2/2023 | Zheng | H04S 3/008 |

FOREIGN PATENT DOCUMENTS

| | | | | |
|---|---|---|---|---|
| KR | 20210073343 A | 6/2021 | | |
| KR | 20220061467 A | 5/2022 | | |
| WO | 2021175455 A1 | 9/2021 | | |
| WO | 2021175457 A1 | 9/2021 | | |
| WO | WO-2021176102 A1 * | 9/2021 | | G06F 3/0482 |
| WO | WO-2022248729 A1 * | 12/2022 | | G06F 3/165 |

OTHER PUBLICATIONS

PhonicMind, retrieved from https://phonicmind.com, Nov. 22, 2022, 12 pages.

Mimilakis et al., "Deep Neural Networks for Dynamic Range Compression in Mastering Applications,", Journal of the Audio Engineering Society, Paper 9539, May 26, 2016, 8 pages.

Broadcast Music, Inc. (BMI), "The American Society of Composers", retrieved from https://www.bmi.com/about, Nov. 22, 2022, 5 pages.

International Standard Recording Code (ISRC, ISO 3901) retrieved from https://www.iso.org/standard/64817.html#:~:text=Abstract &text=This%20document%20specifies%20the%20International,in% 20analogue%20or%20digital%20form, Nov. 22, 2022, 3 pages.

Authors and Publishers (ASCAP) retrieved from https://www.ascap.com/music-users?gclid=EAIaIQobChMIvMH9iJHC-wIVCCZMCh17gwWYEAAYASAAEgKvY_D_BwE, Nov. 22, 2022, 2 pages.

Gesellschaft für musikalische Aufführungs- und mechanische Vervielfältigungsrechte (GEMA) retrieved from https://www.gema.de/, Nov. 22, 2022, 4 pages.

Short-Time Fourier transform (STFT), function of MATLAB (The MathWorks, Inc.) retrieved from https://www.mathworks.com/help/signal/ref/stft.html, Nov. 22, 2022, 4 pages.

European Patent Application No. EP 22 208 831.2, Extended European Search Report dated May 17, 2023, 20 pages.

Jansson et al., "Singing Voice Separation With Deep U-Net Convolutional Networks", 18th International Society For Music Information Retrieval Conference Suzhou, China, Jan. 1, 2017, 7 pages.

* cited by examiner

METHOD AND SYSTEM FOR ACCELERATED DECOMPOSING OF AUDIO DATA USING INTERMEDIATE DATA

The present invention relates to a method, a system and a computer program for processing audio data. More specifically, the invention relates to processing mixed audio signals which contain a mixture of different musical timbres, such as to obtain audio signals which represent only one of the musical timbres contained in the original audio signal, separated from the other musical timbres.

Decomposing musical songs into its constituent musical timbres or isolating specific musical timbres from the original audio mix has recently gained significant importance in the field of audio processing and audio playback as it allows access to individual instrumental or vocal tracks. Decomposed audio signals may be used for live entertainment by DJs or performance artists to create remixes, mashups, stereo or multichannel 3D rearrangements of instruments, or crossfades between two songs and the like. For example, a user may change from playback of the original song to playback of only the vocals of the song (acapella version of the song) or to playback of only the instrumentals of the song (karaoke version of the song), or vice versa.

Decomposition algorithms, sometimes also called source separation algorithms, are conventionally known as processing mixed stereo audio files of songs which are widely available through online music stores such as iTunes or music streaming services such as Apple Music, SoundCloud etc. The audio files are analyzed within an artificial intelligence system, comprising a trained neural network, such as to obtain one or more decomposed tracks representing individual musical timbres (musical instruments or vocal components) contained in the audio signal of the original song as such. Thus, a specific decomposed track may contain one of the musical timbres separated from the other musical timbres of the song. Examples of decomposition algorithms are disclosed in WO 2021/175455 A1 which may, for example, be able to extract, from a mixed audio file, a decomposed vocal track, a decomposed drum track and other decomposed instrumental tracks.

Decomposing audio files using artificial intelligence systems is a demanding computational task which requires high-performance hardware and occupies a significant part of the available resources. Although modern computer technique combined with segment-wise processing of the audio data may be fast enough to obtain decomposed tracks within a few seconds or even in real time during playback of the song, such as described in WO 2021/175457 A1 for example, performance of live decomposition may be unsatisfactory on some devices, such as some mobile phones which have limited hardware resources or standalone embedded DJ systems which typically have limited hardware resources as well. Even if computational power of the device is sufficient, decomposition of audio files occupies large parts of the resources of the device and consumes a significant amount of energy.

It is therefore an object of the present invention to provide a method, a system and/or a computer program which allow obtaining one or more decomposed tracks from mixed input audio data while reducing the processing time and/or resources required.

In order to solve the aforementioned object, according to a first aspect of the present invention, there is provided a method for processing audio data, comprising the steps of providing song identification data identifying a particular song from among a plurality of songs or identifying a particular position within a particular song, loading intermediate data associated with the song identification data from a local storage medium or from a remote device, obtaining input audio data representing audio signals of the song as identified by the song identification data, wherein the audio signals contain a mixture of different musical timbres, including at least a first musical timbre and a second musical timbre different from said first musical timbre, and combining the input audio data and the intermediate data with one another to obtain output audio data, wherein the output audio data represent audio signals of the first musical timbre separated from the second musical timbre.

According to an important feature of the first aspect of the present invention, output audio data having the first musical timbre separated from the second musical timbre will be obtained from a combination of the original input audio data and the intermediate data, wherein the intermediate data are prepared in advance and can quickly be loaded from the local storage medium or the remote device. Song identification data are used to select and load the correct set of intermediate data. In this way, a local device having lower processing power such as a mobile device, may use intermediate data prepared in advance in order to skip a significant part of the processing, in particular resource intensive calculations such as a processing within an artificial intelligence system. The intermediate data may either be prepared in advance by a device having higher processing power, such as a remote device, for example a remote server, and then loaded from the remote device into the local device, or they may be prepared in advance by the local device itself, however, at an earlier point in time, when sufficient time or sufficient local resources were available (for example over night, in particular as offline processing).

Furthermore, since the method of the first aspect of the invention further comprises a step of combining the intermediate data with the input audio data, the intermediate data does not need to contain the complete audio information for producing the output audio data, and therefore the intermediate data may have a compact size or a high compressibility, such as to effectively utilize the size of the storage medium and/or the communication bandwidth to and from the remote device. As a result, the storage medium or the remote device may store and/or provide for a large number of sets of intermediate data for a large number of different songs, prepared in advance and held ready for quickly being loaded on demand.

According to a second aspect of the present invention, in order to solve the abovementioned object of the invention, there is provided a method for processing audio data comprising the following steps: providing song identification data identifying a particular song from among a plurality of songs or identifying a particular position within a particular song, obtaining input audio data representing audio signals of the song as identified by the song identification data, wherein the audio signals contain a mixture of different musical timbres, including at least a first musical timbre and a second musical timbre different from said first musical timbre, processing the input audio data by using an artificial intelligence system which includes at least one neural network, such as to obtain intermediate data which are specific for the song identification data, wherein the intermediate data are configured to obtain output audio data representing audio signals of the first musical timbre separated from the second musical timbre when combined with the input audio data, storing the intermediate data in association with the song identification data in a storage medium and/or transmitting the intermediate data in association with the song identification data to a remote device.

According to the second aspect of the invention, intermediate data are prepared as an important preliminary result or interim result of the overall process of decomposing input audio data into decomposed output audio data, i.e., output audio data in which at least a first musical timbre of the original song is available separated from other musical timbres of the song. By storing the intermediate data in association with the song identification data in a storage medium, in particular in a file, and/or transmitting the intermediate data in association with the song identification data to a remote device, for example as a file or in data packages or even byte-wise, the second aspect of the invention provides for establishing a source of different sets of intermediate data for different songs, based on which source, later on, decomposed output data can be derived more time efficiently and/or more resource efficiently, in particular by means of a method of the first aspect of the invention.

In an embodiment of the second aspect of the invention, the method may comprise the steps of receiving the song identification data from the remote device, obtaining and processing the input audio data identified by the song identification data such as to obtain intermediate data associated with the song identification data, and transmitting the intermediate data to the remote device. Thus, intermediate data for a specific song or song position may be calculated and returned to the remote device upon demand of the remote device. Preferably, a time between receiving the song identification data from the remote device and start of transmission of the intermediate data to the remote device is less than 60 seconds, more preferably, less than 10 seconds, such as to provide individual decomposed audio data upon request. Moreover, a time between receiving the song identification data from the remote device and completion of transmission of the intermediate data or at least completion of transmission of a chunk of intermediate data which is processable by the second processing, to the remote device, is less than 60 seconds, more preferably, less than 10 seconds, such as to allow quick availability of decomposed audio data.

In another embodiment of the second aspect of the invention, the method may comprise the steps of providing a plurality of sets of song identification data for different songs and/or different positions within a song, obtaining and processing input audio data for each of the sets of song identification data such as to obtain a respective plurality of sets of intermediate data, storing each set of intermediate data in association with its song identification data within the storage medium, respectively, receiving demand song identification data from the remote device, reading intermediate data associated with the demand song identification data from the storage medium, and transmitting the intermediate data associated with the demand song identification data to the remote device. In this embodiment, a database of intermediate data is prepared and stored within the storage medium in advance and, upon demand by a remote device, intermediate data for a specific song can then be read from the storage medium and sent to the remote device. In this way, intermediate data may be provided to the remote device upon demand within a relatively short amount of time, and local processor load can be balanced.

In an embodiment, the storage medium may store the intermediate data in combination with the associated audio data of the song or song portion associated with the song identification data. Specifically, the intermediate data could belong to the metadata or tags, such as ID3 tags, of the audio files containing the audio data, for example in an MP3 or WAV format. The intermediate data may then be transmitted to the remote device as an audio file together with the associated audio data.

In the context of the present invention, audio data, such as input audio data and output audio data, refer to a digital representation of analog audio signals sampled with a predetermined sampling rate fs given by the number of samples per second. Sampling may be carried out during recording through an analog-to-digital-converter, such as an audio interface, for example. In case of digitally produced audio data (for example from digital synthesizers, drum computers etc.), the samples are computer generated values. The samples thus represent the amplitude values of the audio signal at equidistant time points separated by the sampling time T according to the sampling frequency fs=1/T. For audio files, fs may be 44.1 kHz or 48 kHz, for example. Audio data are usually stored as audio files in a conventional compressed audio file format, such as MP3 or AAC, or in an uncompressed audio file format, such as WAV or AIFF. Each audio file usually contains one entire song and, optionally, metadata such as title, album title, artist, composer, etc.

In contrast to audio data, intermediate data and song identification data both may have a more compact or a more compressible or a more efficient data structure. In particular, an input audio data set of input audio data and an associated intermediate data set of intermediate data obtained from the input audio data set or to be combined with the input audio data set may fulfill at least one of the following conditions: a data set size of the intermediate data set is smaller than a data set size of the input audio data set, the intermediate data set is compressible with a higher data compression ratio than the input audio data set, the intermediate data set contains less audio information than the input audio data set or no audio information. For example, the intermediate data may be compressed using an entropy coding scheme, in particular a Huffman coding.

In the context of the present invention, song identification data may be configured such as to identify a particular song from among a plurality of songs and/or to identify a position within a song. As regards identification of a particular song, it should be noted that, within the present description, a song is understood as being an individual piece of music or an individual title, for example a title available through conventional music distribution platforms, such as Apple Music, Spotify, etc., or a title individually registered by conventional collecting societies/performing rights organizations, such as Broadcast Music, Inc. (BMI), The American Society of Composers, Authors and Publishers (ASCAP), Gesellschaft für musikalische Aufführungs- and mechanische Vervielfältigungsrechte (GEMA), for example. Song identification data may thus contain any identification information allowing to identify a song, such as for example a data set or string containing a song title, an artist name, a total duration of the song, or a registered code of the song, such as the International Standard Recording Code (ISRC, ISO 3901). The song identification data may also contain an audio fingerprint of the original audio signal, e.g. a fraction of audio signal which identifies the song via a song recognition algorithm. As regards identification of a position within the song, the song identification data may contain information about a point in time or a time interval within the song along the playback time axis of the song from start to end of the song.

It should be noted that, in the context of the present invention, two sets of song identification data are regarded equal, if they identify the same song or the same position within the same song, regardless of whether or not the two sets of song identification data are actually exact copies. For example, song identification data of a first format identifying a specific song A by storing an audio fingerprint, i.e. a fraction of the original audio data, are regard to be equal to song identification data of a second format identifying the same song A by means of a string containing the ISRC code of song A. Therefore, in embodiments of the methods or systems of the present invention, the song identification data may change with regard to their format while still referring to the same song or the same song position (position within the song).

Important technical effects of the present invention rely upon dividing the computational workload, which is required for the process of decomposing mixed input audio data to obtain decomposed output data, into separate instances of processing, which may run at different times and/or on different devices. In particular, let us assume in the present disclosure that the step of processing input audio data by using an artificial intelligence system such as to obtain intermediate data as included in the method of the second aspect of the present invention is referred to as a first processing, and the step of combining input audio data and the intermediate data with one another to obtain (decomposed) output audio data as included in the method of the first aspect of the present invention is referred to as a second processing. Then, a significant portion of the expenditure on computational work and resources required for the process of decomposing mixed input audio data into decomposed output data is assumed by the first processing (which may run on a high-performance device and/or on a low-performance device in advance, i.e. at a time at which more resources are available or at which longer processing time is acceptable, for example overnight), in order to relieve load from the second processing (which may run on a device with lower processing power than the high-performance device), and therefore allow the second processing to be performed in a shorter amount of time for example for live performances or real-time playback. Specifically, the first processing may have a higher level of computational and/or algorithmic and/or arithmetic complexity than the second processing, for example may involve a higher number of floating-point operations and/or keep a higher amount of data in memory than the second processing. Stated otherwise, the first processing may in general be more time-consuming and/or more resource-consuming than the second processing.

More particular, the first processing may comprise a difficult or resource-intensive analysis of the frequency spectrum of the input audio data and identifying characteristic frequencies of certain musical instruments or vocals, for example based on a Short-Time Fourier-transformation of audio data obtained from the input audio data. In a preferred embodiment of the present invention, intermediate data loaded from the storage medium or the remote device are obtainable as the result of a previous first processing using an artificial intelligence system (AI system) which includes at least one trained neural network. The AI system may implement a convolutional neural network (CNN), which has been trained by a plurality of data sets for example including a vocal track, a harmonic/instrumental track and the original input audio data.

Examples for conventional AI systems capable of separating source tracks such as a singing voice track from a mixed audio signal include: Prétet, "Singing Voice Separation: A study on training data", Acoustics, Speech and Signal Processing (ICASSP), 2019, pages 506-510; "spleeter"—an open-source tool provided by the music streaming company Deezer based on the teaching of Prétet above, "PhonicMind" (https://phonicmind.com)—a voice and source separator based on deep neural networks, "Open-Unmix"—a music source separator based on deep neural networks in the frequency domain, or "Demucs" by Facebook AI Research—a music source separator based on deep neural networks in the waveform domain.

In the context of the present disclosure, input audio data represent audio signals of a song that contains a mixture of different musical timbres, wherein the timbres can be understood as components of the sound originating from different sound sources, such as different musical instruments, different software instruments or samples, different voices etc. In the context of the present invention, a timbre may also include a mixture of different sound sources as long as it does not include all sound sources that make up of the sound of the song. For example, a drum timbre may include all timbres of all drum instruments, or a harmonic timbre may include all instruments and vocal timbre components which contribute to the harmony of the sound. In particular, input audio data usually originate from mixing a plurality of source tracks of different timbres, in particular during music production or recording a live musical performance of instrumentalists and/or vocalists. For example, a first source track may be a vocal track (vocal timbre) obtained from recording a vocalist via a microphone, while a second source track may be an instrumental track (instrumental timbre) obtained from recording an instrumentalist via a microphone or via a direct line signal from the instrument or via MIDI through a virtual instrument. Usually, a plurality of such tracks of a song are recorded at the same time or one after another. The plurality of source tracks of the song are then transferred to a mixing station, wherein the source tracks are individually edited, various sound effects and individual volume levels are applied to the source tracks, all source tracks are mixed in parallel, and preferably one or more mastering effects are eventually applied to the sum of all tracks. At the end of the production process, the final audio mix, usually a stereo mix, of the song is stored in a suitable recording medium, for example in an audio file on the hard drive of a computer. Such audio files each contain one song and preferably have a conventional compressed or uncompressed audio file format, such as MP3, WAV, AIFF or other, in order to be readable by standard playback devices, such as computers, tablets, smartphones or DJ devices. For processing according to the present invention, the input audio data may then be provided as audio files by reading the files from local storage means, receiving the audio files from a remote server, for example via streaming through the Internet from a music distribution platform such as Apple Music or Spotify, or in any other manner.

Input audio data according to the present invention usually represent stereophonic audio signals and are thus provided in the form of stereo audio files, although other types, such as mono audio files or multichannel audio files may be used as well.

It should be noted that, in the context of the present disclosure, separating timbres from one another or decomposing input audio data refers to separating audio signals, which in the original input audio data were mixed in parallel, i.e., overlapped on the time axis, such as to be played together at the same time. Likewise, it should be noted that recombining or mixing of audio signals or tracks refers to overlapping in parallel, summing, downmixing or simultaneously playing/combining corresponding time intervals of the audio signals or tracks, i.e., without shifting the audio signals or tracks relative to one another with respect to the time axis.

In an embodiment of the present invention according to the first aspect and/or the second aspect, the intermediate data may be loaded from a local storage medium, wherein the local storage medium may store a plurality of different sets of intermediate data, which are associated to different sets of song identification data, and wherein loading the intermediate data comprises selecting intermediate data according to the song identification data from among the plurality of sets of intermediate data. A local storage medium, such as a hard drive, can easily be prepared to store even a large number of sets of intermediate data for a respective number of songs, wherein reading intermediate data from such medium is fast and reliable.

In another embodiment of the invention, intermediate data may be loaded from a remote device (external intermediate data), wherein obtaining the intermediate data comprises the steps of transmitting the song identification data from a first electronic device to a second electronic device via communication means, providing, by the second electronic device, intermediate data which are specific for the song identification data, transmitting the intermediate data from the second electronic device to the first electronic device. Since both song identification data and intermediate data have a relatively compact or compressible data structure, transmitting such data between two devices can be completed in a short amount of time and with limited bandwidth, such that output audio data with separated first timbre (decomposed audio data) can be obtained more efficiently when compared to a conventional processing in which output audio data are calculated from the input audio data using the resources of the first electronic device alone, i.e., without using external intermediate data.

The gain in efficiency when processing input audio data to obtain decomposed output audio data may find valuable application in an embodiment of the invention which comprises a step of playing back playback data obtained from the output audio data, wherein the step of combining the input audio data and the intermediate data with one another is carried out during playback of playback data and with a processing speed equal to or higher than the playback speed, i.e. equal to or faster than real time. This means that a time required for obtaining a specific data set of output data is smaller than the time required for playback of the same data set. Thus, real-time playback may be achieved which uses decomposed audio material, such as different decomposed tracks representing audio signals of different musical timbres. For example, a user may quickly change from playback of the original song to playback of only the vocals of the song (acapella version of the song) or to playback of only the instrumentals of the song (karaoke version of the song), or vice versa.

In order to improve performance of the methods and systems of the present invention, in embodiments of the invention, intermediate data may be processed and handled in chunks, in particular in chunks with respect to the time axis. For example, when the first processing is carried out chunk-wise, a first chunk of input audio data may be processed by using the artificial intelligence system such as to obtain a first chunk of intermediate data, wherein the first chunk of intermediate data may be stored in the storage medium or may be transmitted to the remote device before or at the same time as a second chunk of input audio data is processed within the artificial intelligence system. Furthermore, if the second processing is carried out chunk-wise, a first chunk of intermediate data may be combined with a first chunk of input audio data to obtain a first chunk of output audio data, and a first chunk of playback data obtained from the first chunk of output data may be played back before or at the same time as at least one of the following steps are performed: a second chunk of intermediate data is loaded, a second chunk of input audio data is obtained, and a second chunk of input audio data is combined with a second chunk of intermediate data.

To obtain playback data, the output audio data may be used as they are. Alternatively, any suitable audio effect, including filters or amplifiers, may be applied to the output audio data to obtain the playback data. For example, for output audio data containing separated decomposed tracks of different musical timbres, audio effects and/or volume setting could be applied individually and differently to some or all of the decomposed tracks, and the thus modified decomposed tracks, or some of them, could then be recombined with one another to obtain the playback data. Furthermore, 3D/spatial based recombination of some or all of the decomposed tracks may be carried out to position the individual musical timbres within 3D space. Thus, decomposed tracks may be used to create or modify 3D audio, wherein 3D audio means that sound is impinging onto the listener from different directions, either by means of multiple speakers placed around the listener or by playing back a specially synthesized signal through headphones that creates the illusion of sounds coming from arbitrary directions.

Moreover, to obtain playback data from output data, one or more of the decomposed tracks may be mixed with one or more different tracks obtained from a different song or from an audio generator such as a synthesizer.

In a preferred embodiment of the present invention, the intermediate data associated to the song identification data, and the audio data representing audio signals of the song as identified by the song identification data are included within the same data container, preferably the same audio file, such as to be stored and/or transmitted in a joint manner. More preferably, intermediate data of a specific song as identified by the song identification data and the audio data of the same song may be stored and/or transmitted within the same audio file, wherein one audio file includes data of only one song, i.e., different audio files are provided for different songs. Such containers would be very compact and could be stored individually per song for a large number of songs, e.g., by a streaming service. A client on a remote device requesting to stream a particular song would receive the intermediate data along as part of the stream of input audio data (or when loaded from a local storage device) and the client can then decide whether to use the intermediate data for processing or not.

Features and effects of the first aspect of the invention are preferably combined with features and effects of the second aspect of the invention to provide a method comprising the following steps: providing song identification data identifying a particular song from among a plurality of songs or identifying a particular position within a particular song, obtaining a first copy of input audio data representing audio signals of the song as identified by the song identification data, wherein the audio signals contain a mixture of different musical timbres, including at least a first musical timbre and a second musical timbre different from said first musical timbre, processing the first copy of input audio data by using an artificial intelligence system which includes at least one neural network, such as to obtain intermediate data which are specific for the song identification data (first processing), storing the intermediate data in association with the song identification data in a storage medium and/or transmitting the intermediate data in association with the song identification data to a remote device, loading the intermediate data from the storage medium or from a remote device, obtaining the first or a second copy of input audio data representing audio signals of the song as identified by the song identification data, combining the first copy or the second copy of input audio data with the intermediate data to obtain output audio data (second processing), wherein the output audio data represent audio signals of the first musical timbre separated from the second musical timbre.

It should be noted that, in the context of the present invention, the input audio data used to calculate the intermediate data, in particular through the artificial intelligence system, (in particular the first copy of input audio data and/or the input audio data processed within the first processing), and the input audio data to be combined with the intermediate data (in particular the second copy of input audio data and/or the input audio data processed within the second processing), are either the same data or corresponding data representing the same song or the same song position (position within the song) according to the song identification data. Corresponding data means that the two versions of input audio data may differ in compression rate or compression algorithm used for compression, in audio quality, in file format, meta data etc., and may be obtained from the same or different sources, as long as they still represent the same song or the same song position as specified by the song identification data. In other words, corresponding data may in fact be different, even audibly different, as long as they are perceived by a human as representing the same song or the same song position.

In an embodiment of any of the aspects of the present invention, the intermediate data may comprise at least a first mask storing a plurality of mask elements, each mask element being associated with a component of the input audio data, wherein a combination of a particular mask element with its associated component of the input audio data (such as obtained in the second processing) indicates a presence of the first timbre in an audio signal associated with said component. Such mask may be regarded as a filter, which, when applied to the input audio data, filters out one or more musical timbres from the components of input audio data. Thus, advantageously, the size of the intermediate data depends on the number of mask elements, i.e., the number of components of the input audio data, rather than the total size of the input audio data. The size of the intermediate data can therefore usually be relatively small. Preferably, each component of the input audio data refers to a particular frequency or frequency band at a particular point in time or within a particular time interval along the time axis of the input audio data, such that the mask elements are adapted to the nature of musical timbres as they are usually present in audio signals of songs.

In another embodiment of the invention, the step of combining the input audio data and the intermediate data with one another (second processing) may comprise the steps of applying a Short-Time Fourier transform operation of the input audio data to obtain Fourier transformed input audio data, combining the Short-Time Fourier transformed input audio data with the intermediate data to obtain precursor output audio data, and applying an inverse Short-Time Fourier transform operation to the precursor output audio data to obtain the output audio data. In this way, intermediate data may be used which have been produced by neural networks operating on the basis of time-frequency spectra of audio data. Standard Short-Time Fourier transform algorithms are readily available for implementation in this embodiment, which are not regarded as difficult or resource intensive analysis in the sense of the present disclosure and can therefore run on devices with limited performance without requiring a significant amount of time and/or resources.

In another embodiment of the present invention, the method may further comprise the steps of detecting whether a storage medium (such as the local storage medium) stores intermediate data associated to the song identification data, wherein, if the storage medium does not store intermediate data associated to the song identification data, then the following steps are carried out: (i) generating intermediate data by processing, using an artificial intelligence system, audio data representing audio signals of the song as identified by the song identification data, wherein the audio signals contain a mixture of different musical timbres, including at least the first musical timbre and the second musical timbre, (ii) storing the generated intermediate data within a local storage medium, whereas if the storage medium does store intermediate data as identified by the song identification data, then the intermediate data associated to the song identification data is read from the storage medium. In this way, even if the intermediate data are generated by the same device which obtains the output audio data, an advantage of increased efficiency can be achieve by caching intermediate data on a local storage device. Thus, the resource intensive AI based generation of intermediate data for a song or a part of a song will only be required once, whereas subsequent requests for output data of the same song or for the same part of the song may be processed more efficiently using the cached intermediate data instead of the AI system.

According to a third aspect of the present invention, there is provided a computer program product configured to carry out, when run on at least one computer, a method according to the first and/or second aspect of the invention. Thus, the computer program product achieves the same effects and advantages as the embodiments described above.

According to a fourth aspect of the present invention, there is provided a system for processing audio data, comprising a song selection unit, configured to select a particular song from among a plurality of songs or a particular position within a particular song, and to provide song identification data identifying the selected song or the selected position within the song, a first intermediate data unit configured to obtain intermediate data which are specific for the song identification data, a first input audio unit configured to obtain input audio data representing audio signals of the song as identified by the song identification data, wherein the audio signals contain a mixture of different musical timbres, including at least a first musical timbre and a second musical timbre different from said first musical timbre, and a first audio processing unit configured to combine the input audio data and the intermediate data with one another to obtain output audio data, wherein the output audio data represent audio signals of the first musical timbre separated from the second musical timbre. This system achieves the same or corresponding effects and advantages as the embodiments described above with respect to the first aspect of the invention, and it is preferably configured to carry out a method of the first aspect of the invention.

According to a fifth aspect of the present invention, there is provided a system for processing audio data, wherein the system comprises: a song selection unit, configured to select a particular song from among a plurality of songs or a particular position within a particular song, and to provide song identification data identifying the selected song or the selected position within the song, a second input audio unit configured to obtain input audio data representing audio signals of the song as identified by the song identification data, wherein the audio signals contain a mixture of different musical timbres, including at least a first musical timbre and a second musical timbre different from said first musical timbre, a second intermediate data unit comprising an artificial intelligence system which includes at least one neural network, wherein the second intermediate data unit is configured to obtain intermediate data which are specific for the song identification data, wherein the intermediate data are configured to obtain output audio data representing audio signals of the first musical timbre separated from the second musical timbre when combined with the input audio data, and at least one of a storage medium configured to store the intermediate data in association with the song identification data, and communication means configured to transmit the intermediate data to a remote device. This system achieves the same or corresponding effects and advantages as the embodiments described above with respect to the second aspect of the invention, and it is preferably configured to carry out a method of the second aspect of the invention.

The units and functionalities of the systems of at least one of the fourth and fifth aspects of the present invention may be realized by means of at least one electronic device, such as at least one computer, preferably having a processor (CPU), a Random-access memory (RAM) and a read-only memory (ROM), as well as, optionally, at least one of a local storage means such as a hard drive, data communication means such as a network adapter for connecting to an external network (e.g. the Internet), user communication means including input means for accepting input from a user, and user output means for presenting output to a user. The output means may comprise audio output means for reproducing playback audio data obtained from the output data through headphones, speakers or a PA system. Furthermore, the output means may comprise display means for displaying information regarding the operation of the system to the user. Input means and output means may be combined, for example as a touch display. The functions and components of the systems of the invention may be implemented within a single device or may be distributed among a plurality of electronic devices as will be described in more detail below.

In a preferred embodiment, the system of at least one of the fourth and fifth aspects of the present invention may comprise a first electronic device, a second electronic device, and data communication means for transmitting the song identification data from the second electronic device to the first electronic device, and for transmitting intermediate data which are specific for the song identification data from the first electronic device to the second electronic device. In such embodiment, computational workload can effectively be split up such that the rather resource intensive first processing using an AI system may be carried out by the first electronic device, whereas the second processing is carried out by the second electronic device. Thus, if the second electronic device has limited resources, for example is a mobile device, high quality decomposed output data are nevertheless available at the second electronic device by shifting resource intensive parts of the calculation to the first electronic device. Furthermore, since the song identification data and the intermediate data have compact and/or compressible data structures as described above, data communication between the first electronic device and the second electronic device is fast and can thus be secured even with limited bandwidth.

Preferably, the first electronic device comprises a first input audio unit, configured to obtain a first copy of the input audio data, and the intermediate data generating unit configured to generate the intermediate data, wherein the data communication means are configured to transmit the intermediate data generated by the intermediate data generating unit from the first device to the second device. The first copy of the input audio data may in principle be obtained from any suitable source, such as a remote device or a local storage means storing a plurality of sets of input audio data for a plurality of different songs. Preferably the first copy of the input audio data is streamed through the Internet from a music distribution platform.

The first electronic device may be configured to directly generate intermediate data for a specific song upon request of the second electronic device and return the intermediate data to the second electronic device. Furthermore, the first electronic device may comprise storage means for storing a plurality of sets of intermediate data for a respective plurality of different songs, wherein each set of intermediate data is stored in association with its song identification data. The first electronic device may in this way be configured to receive demand song identification data from a remote device, read out intermediate data associated with the demand song identification data from the storage medium, and transmit the intermediate data associated with the demand song identification data to the remote device.

In another embodiment of the system of at least one of the fourth and fifth aspects of the present invention, the second electronic device comprises the song selection unit, the intermediate data loading unit, a second input audio unit, configured to obtain a second copy of the input audio data, the audio processing unit, configured to combine the second copy of the input audio data and the intermediate data loaded by the intermediate data loading unit with one another to obtain the output audio data, and a playback unit configured to play playback data obtained from the output audio data. Such second electronic device would be suitable for being operated by a used to allow the user to select a song and obtain decomposed output audio data quickly even when the second electronic device has limited resources and/or is a mobile device.

Although it would be possible for the first electronic device and the second electronic device to exchange input audio data such that the first and second copies of the input audio data would actually be the same data, it is preferred that the second electronic device receives its own second copy of the input data directly from either a local storage means or via streaming from a remote music distribution platform. Thus, exchange of large audio data between the first electronic device and the second electronic device can be avoided.

In another embodiment, a system of at least one of the fourth and fifth aspects of the invention may comprise an electronic device (preferably a single electronic device or a local group of electronic devices) which comprises the song selection unit, the intermediate data generating unit, the input audio unit, the audio processing unit, and a playback unit configured to play playback data obtained from the output audio data, wherein the intermediate data generating unit comprises an artificial intelligence system configured to generate the intermediate data by processing audio data representing audio signals of the song as identified by the song identification data, wherein the audio signals contain a mixture of different musical timbres, including at least the first musical timbre and the second musical timbre, and a storage medium configured to store the generated intermediate data. Such electronic device, on the one hand, has its own artificial intelligence system and thus is capable of generating decomposed output data using its own resources, and, on the other hand, reduces the time/resources required for obtaining decomposed output data for songs or parts of songs that have already been processed within the artificial intelligence system by caching previous processing results. Furthermore, since intermediate data having a compact data structure are stored within the storage medium, instead of audio data, storage capacity and time for reading/writing the data can be kept at a minimum.

In another embodiment, a system of at least one of the fourth and fifth aspects of the invention may comprise a mixing unit for mixing first audio data at a first volume level with second audio data at a second volume level such as to obtain third audio data, wherein the first audio data are obtained from the output audio data, and a playback unit for playing back playback data obtained from the third audio data. In this system, first audio data which are obtained from the output audio data and therefore include the separated first timbre, may be mixed with any other suitable audio data, for example a decomposed audio track including the second musical timbre or any other musical timbre, or audio data which originate from a different source, such as an audio generator or from a different song. For the first audio data, the output audio data may be used as they are, or alternatively, any suitable audio effect, including filters or amplifiers, may be applied to the output audio data to obtain the first audio data. More particularly, the system may be configured as DJ equipment, comprising a song-A input audio unit for receiving input audio data of a first song A, and a song-B input audio unit for receiving input audio data of a second song B, which is different from the first song A. The configuration of the system may further be such that, from the input audio data of both songs A and B, output audio data will be obtained, respectively, wherein, for at least one of the two songs A and B, processing means for separating at least one musical timbre may be provided, in particular an audio processing unit for separating the first musical timbre as described above. The mixing unit may then mix the first audio data obtained from the output data of song A with the second audio data obtained from the output data of song B.

A system which comprises a mixing unit as described above, may further comprise a user control unit which includes at least one control element configured for accepting a user input for controlling at least one of a ratio or relation between the first volume level and the second volume level, the first volume level independently from the second volume level, and the second volume level independently from the first volume level.

The computer program of the third embodiment and the system of the fourth and fifth embodiments preferably include any additional features and achieve respective additional effects as described above with respect to the method of the first and/or second aspects of the inventions. In particular, at least one of the systems of the fourth and fifth aspects may be configured to carry out at least one of the methods of the first and second aspects.

Figure 2:
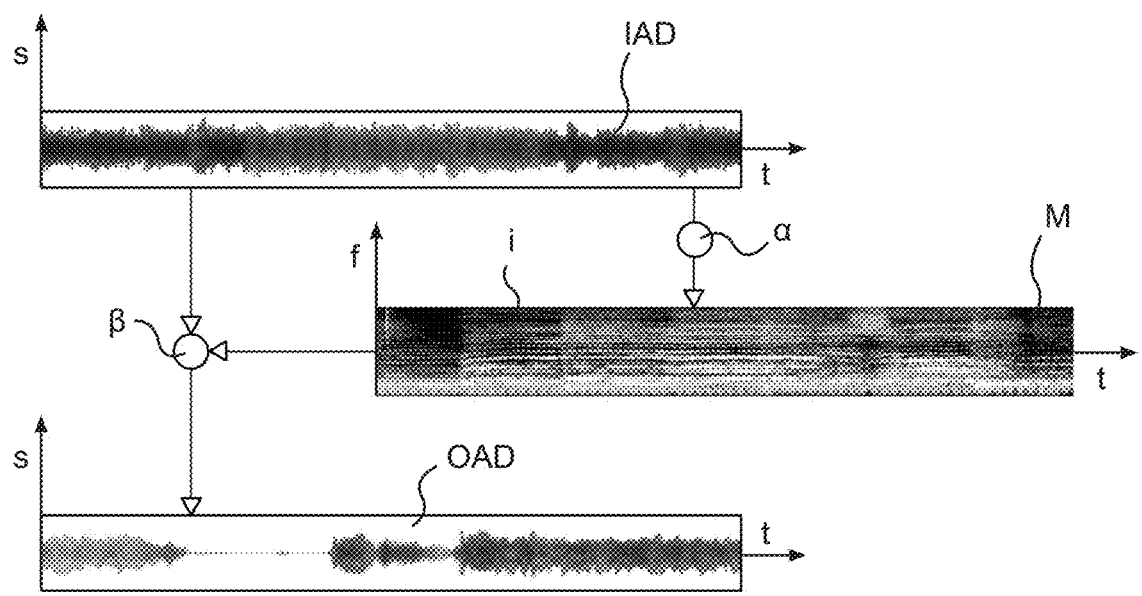
Figure 3:
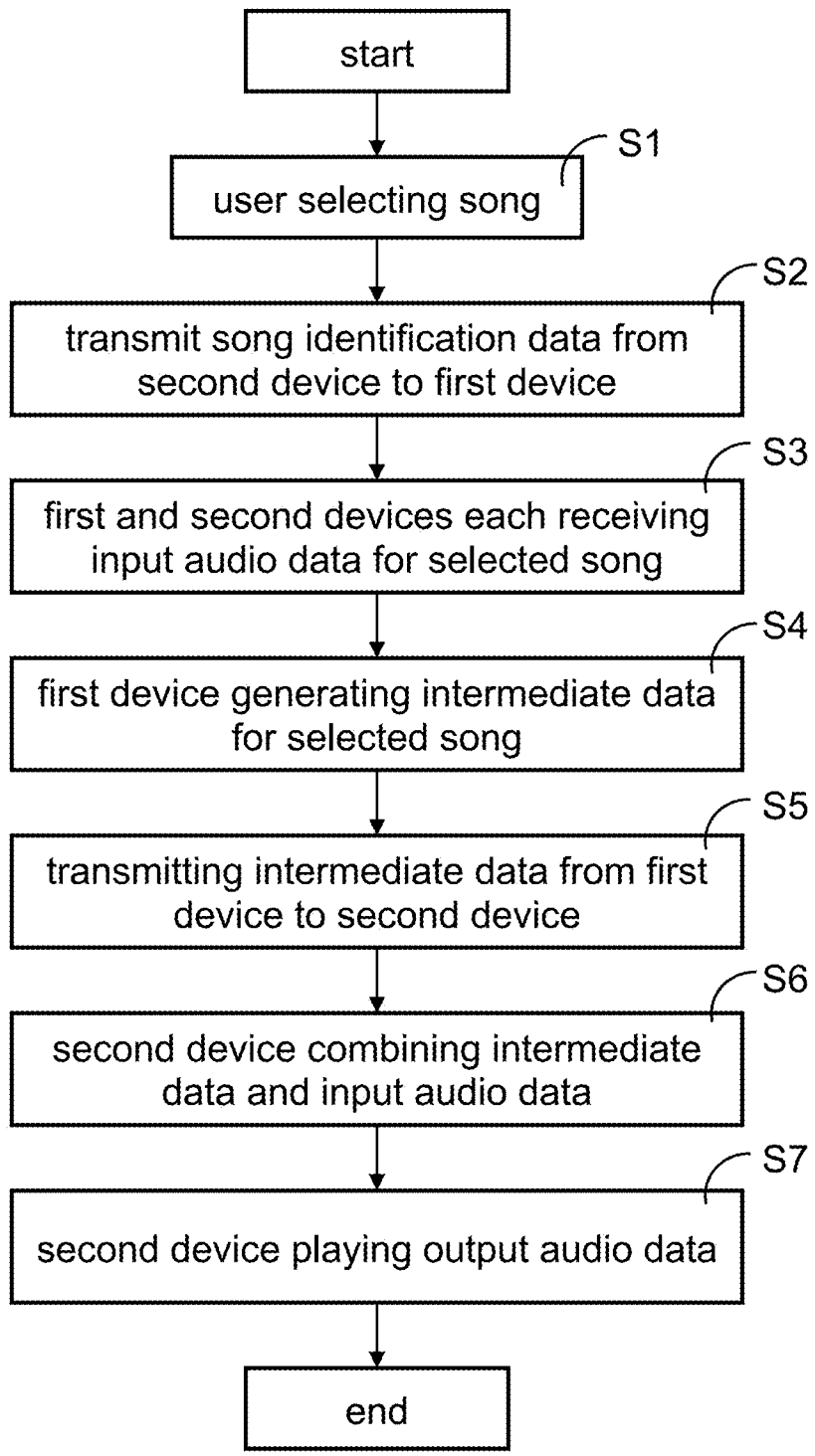
Figure 4:
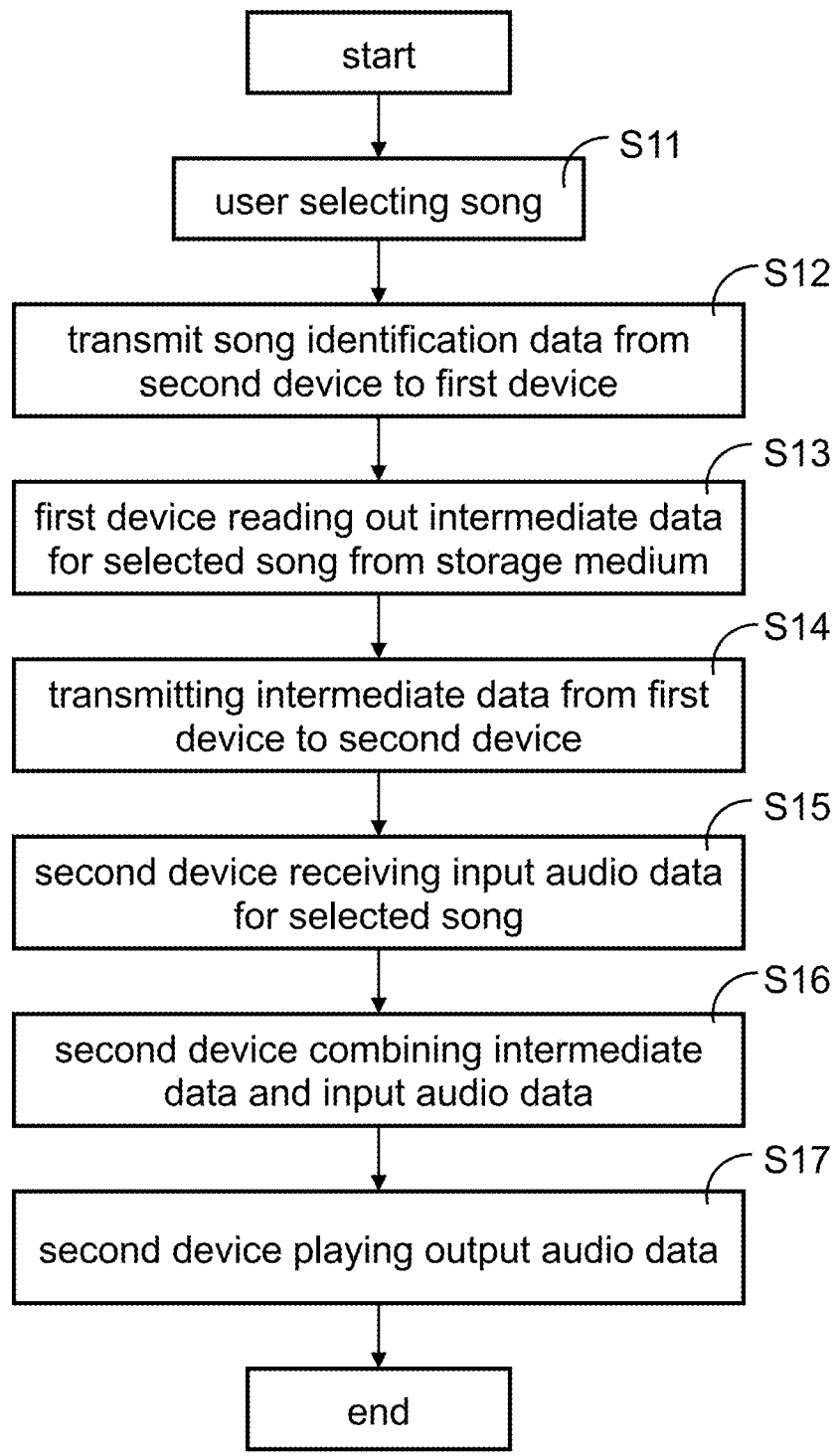
Figure 5:
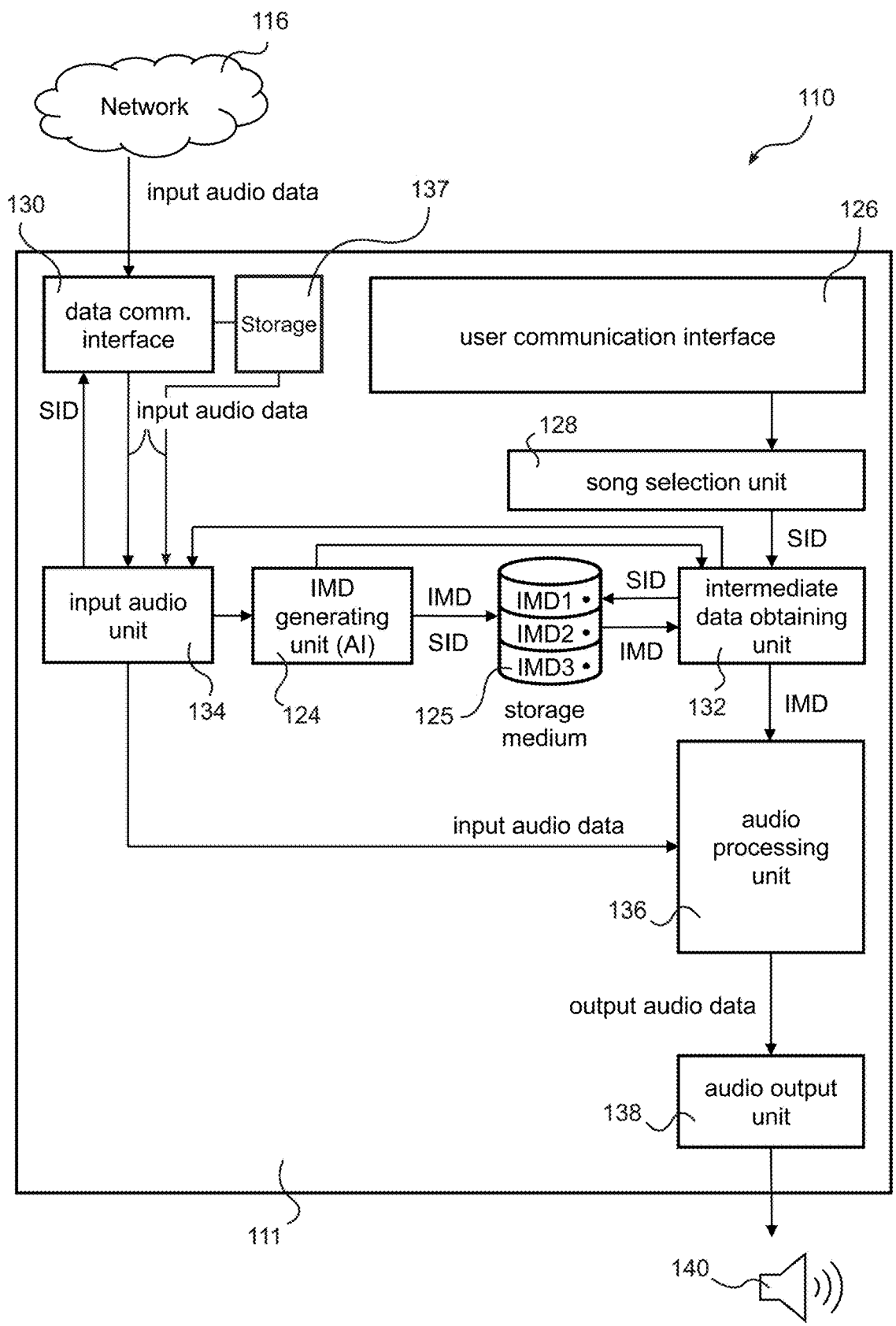
Figure 6:
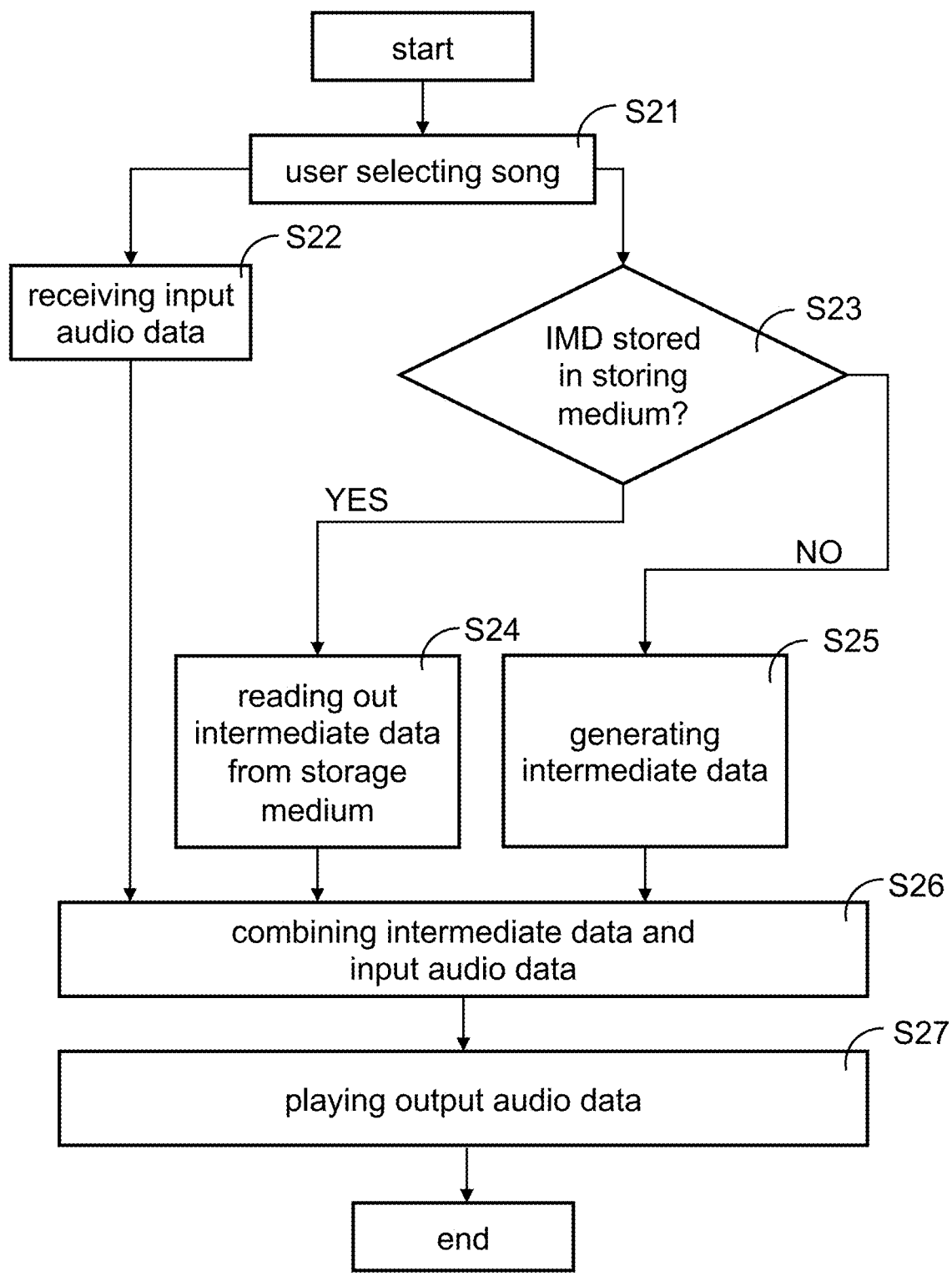

Further embodiments and effects of the present invention will be apparent from the following description of preferred embodiments with respect to the accompanying drawings, in which:

FIG. 1 shows a functional drawing of a system for processing audio data according to a first embodiment of the invention, FIG. 2 shows a schematic illustration of a process of generating intermediate data and combining intermediate data with input audio data within a system of the first embodiment of the invention, FIG. 3 shows a flow chart showing a method for processing audio data according to a second embodiment of the invention, FIG. 4 shows a flow chart showing a method for processing audio data according to a variant of the second embodiment of the invention, FIG. 5 shows a functional drawing of a system for processing audio data according to a third embodiment of the invention, and FIG. 6 shows a flow chart showing a method for processing audio data according to a fourth embodiment of the invention.

A first embodiment of the invention is shown in FIG. 1 as being a system 10, which comprises a first device 12, a second device 14 and a network 16 connecting first and second devices 12, 14 with one another. First and second devices 12, 14 may each be formed by an electronic data processing device, each comprising a processor, data interfaces, RAM, ROM and storage means. In the present embodiment, the first device 12 is a computer having sufficient resources for conducting resource intensive calculations, for example a computer using multicore processor technology or at least one Neural Processing Unit (NPU, which accelerates neural network operations such as convolutions and matrix multiplies, for example the Apple Neural Engine) and/or high-capacity storage means, whereas the second device 14 is a mobile device, such as a mobile phone or a tablet computer. Network 16 is preferably the Internet but may alternatively be realized by a local network such as a Wi-Fi network, a Bluetooth network, a LAN network or a simple cable connection, such as a USB connection.

First device 12 may include a data communication interface 18 for exchanging data with network 16, for example by using a suitable internet protocol or any other network or communication protocol. Furthermore, first device 12 may include a song selection unit 20 configured to receive song identification data (SID) identifying a specific song from among a plurality of songs or a specific position within a song, and to send request to obtain input audio data to the network 16 via data communication interface 18, based on the song identification data. In addition, first device 12 may include an input audio unit 22 which is configured to receive input audio data from the network 16 via data communication interface 18.

First device 12 may further comprise an intermediate data generating unit 24 which includes an artificial intelligence system (AI system). The AI system used in the embodiments of the present invention may be a trained artificial neural network as described above in this disclosure. In particular, a trained artificial neural network as described by Prétet et al. could be used which is able to extract a decomposed track representing a vocal timbre or any other musical timbre from the mixed input audio data. The AI system may be prepared by training, for example using data sets containing a large number of professionally recorded or produced songs from different genres, for example Hip Hop, Pop, Rock, Country, Electronic Dance Music etc., wherein the data sets of the songs do not only include the mixed audio data of the songs (i.e. the stereo audio files as available through known music distribution platforms) but also the respective vocal and instrumental tracks as separate recordings, also called stems. Preferred details of the configuration and operation of the intermediate data generating unit and in particular the AI system are described in the following.

Within the AI system, input audio data, which is a sequence of discrete signal amplitude values along a time-axis, may first be transformed by using a Short-Time Fourier Transform algorithm into a discrete time-frequency spectrogram. The time-frequency spectrogram still has the time on the first axis, just like in the input audio data, albeit it may have reduced resolution, i.e., divided into time intervals larger than the sampling time interval of the input audio data. Along the time axis, instead of single amplitude values, the time-frequency spectrogram has vectors of frequency values and corresponding intensity values. The audio signals of the input audio data are thus transformed into discrete components, wherein each component refers to an intensity value at a particular frequency and a particular point in time, or, more precisely, a particular frequency band at a particular time interval along the time axis of the audio data. Each component in the time-frequency spectrogram is a complex number, indicating the intensity and phase of those signal portions of the audio signals, which fall into the particular frequency band and the particular time interval of that spectrogram component. Therefore, the input audio data are transformed from the time domain to the time-frequency domain. A suitable algorithm which can be applied to calculate such transformation is the Short-Time Fourier transform (STFT), which is known as such and can be easily implemented in the processing according to the present embodiment by way of a software algorithm obtained from public software libraries. For example, stft function of MATLAB (The MathWorks, Inc.) may be used to calculate the time-frequency spectrogram. The Short-Time Fourier transform is reversible by using an inverse Short-Time Fourier transform (see for example istft function in MAT-LAB).

As an assumption of the decomposition algorithm, each component of the two-dimensional time-frequency spectrogram is attributed to mainly correspond to one of the different musical timbres (one of the instruments or vocals) constituting the audible audio signal. Therefore, decomposition or source separation can be performed by identifying the musical timbre each spectrogram component corresponds to. For identification of the musical timbre, the spectrogram components are processed within the neural network of the AI system of the intermediate data generating unit 24, which has previously been trained to identify musical timbres as described above. The neural network delivers the results of the identification in the form of one or more data matrices, one matrix for each musical timbre included in the audio signal. The matrices of each are of the same dimensionality as the original time-frequency spectrogram, wherein the data matrix of a particular musical timbre contains the time t on the first axis, frequency f on a second axis and at each coordinate (t, f) a 1 if the corresponding component in the spectrogram belongs to the particular musical timbre and a 0 if otherwise. In a variant of the first embodiment, a more advanced implementation may be used in which the masks contain real values between 0 and 1, which allows a more precise separation by partially assigning components in the spectrogram to multiple musical timbres.

These matrices are called masks and constitute intermediate data (IMD) according to the present invention. In particular, a set of masks for a respective plurality of musical timbres of one song are regarded as a set of intermediate data (or "the intermediate data") for that song or song position, i.e., that set of masks is associated with particular song identification data identifying that song or song position.

As described above and illustrated in FIG. 2 for the first embodiment of the invention, in a first processing a, input audio data IAD of the song are processed within the artificial intelligence system of the intermediate data generating unit 24 to obtain at least one mask M for a specific timbre. The masks can be regarded as a key to the separation of the musical timbres, because the mask M can easily be combined in a second processing 13 with the input audio data to obtain decomposed output audio data OAD, in particular an audio signal having a first musical timbre separated from the other musical timbres. For this purpose, the time-frequency spectrogram of the input audio data may again be calculated as described above (e.g. using STFT), and the spectrogram may then be point-wise multiplied with the respective mask for the first musical timbre, such as to force all components of the time-frequency spectrogram which do not contain the first musical timbre to 0 and thus filter out only the components containing the first musical timbre. The result of the combination may then be transformed back to the time domain (e.g., using ISTFT) to obtain the output audio data OAD which again have time t on the first axis and signal amplitudes s on the second axis. In the first embodiment described with reference to FIG. 1 and FIG. 2, the combination of the masks M with input audio data IAD is not carried out within the first device 12 but will be part of the processing in the second device 14 as described below.

A set of masks calculated for a song by intermediate data generating unit 24 may be stored within a local storage medium (not illustrated in FIG. 1) in association with the song identification data of the song for later retrieval and transfer via data communication interface 18 and network 16 to the second device 14. Furthermore, the set of masks may directly be forwarded from intermediate data generating unit 24 via data communication interface 18 and network 16 to the second device 14. In both cases, the transfer may be initiated upon request of the second device 14 as will be described later.

The second device 14 may include a user communication interface 26 for accepting user input and showing notifications to a user. Preferably, communication interface 26 comprises a touch display which accepts touch gestures as user input and displays graphics and text as conventionally known for mobile devices. Alternatively, standalone embedded DJ systems with respective control interfaces may be used. Furthermore, the second device 14 may include a song selection unit 28 which allows a user to select a particular song from among a plurality of different songs stored in a local storage medium (not shown in FIG. 1) or accessible through a remote music distribution platform (not shown in FIG. 1) through streaming via a data communication interface 30 integrated in the second device 14. Song selection unit 28 may display, via user communication interface 26, a list of available songs or a search functionality for searching within available songs, such as to allow a user to select a song. Furthermore, song selection unit 28 may provide unique song identification data specific for the selected song or song position and may transfer the song identification data to data communication interface 30 for sending to the first device 12 via network 16.

Second device 14 may further comprise an intermediate data loading unit 32 connected to the data communication interface 30 and configured to receive intermediate data from the first device 16 via network and data communication interface 30. Moreover, second device 14 may comprise an input audio unit 34 configured to receive input audio data of the selected song from the network 16 via data communication interface 30.

Included in the second device 14 there may further be an audio processing unit 36 which receives and combines with one another the intermediate data from the intermediate data loading unit 32 and the input audio data from the input audio unit 34, such as to obtain output audio data. In particular, in order to obtain output audio data containing decomposed audio signals of the first musical timbre, audio processing unit 36 may carry out the point-wise multiplication of the first-timbre mask of the intermediate data with the time-frequency-spectrogram of the input data to filter out only the components containing the first musical timbre, and then a transformation back to the time domain (e.g. using ISTFT) is performed to obtain the output audio data. As the matrix multiplication and Short-Time Fourier transformation (including ISTFT) are straightforward algorithms of relatively low complexity (as compared to, e.g. the operation of a neural network), the processing based on the intermediate data within the audio processing unit 36 as described above can be carried out on the second device 14 with sufficient efficiency, even if the second device has limited resources.

Output audio data may then be further processed in an audio output unit 38, which may include at least one of an audio filter unit for applying one or more audio filters, a playback control unit connected to the user communication interface 26, for allowing a user to start, stop, pause, forward, reverse or otherwise control the playback of the output audio data, a volume setting unit for setting the volume of at least the output audio data, and a mixing unit for mixing the output audio data with other audio data, for example an audio signal containing, in a separated manner, the second musical timbre or any other musical timbre of the song, or an audio signal generated by an audio generator or obtained from a different, second song. The playback audio data output by the audio output unit 38 may then be converted into an analog audio signal by a digital-to-analog-converter of an audio interface (both not shown in FIG. 1) for playback through speakers 40, headphones or a PA system.

A method for processing audio data according to the second embodiment of the present invention will be described below with reference to FIG. 3. The method of the second embodiment may be carried out by the system according to the first embodiment.

In step S1 after start of the process, a user, at the second device 14, selects a song from a plurality of available songs. In step S2, song identification data of the selected song (for example it's ISRC code, or a string including "title", "artist" etc.) are obtained and transmitted from the second device 14 to the first device 12 via network 16. Based on the song identification data received, in step S3, the first device 12 requests download of a first copy of input audio data as identified by the song identification data via network 16 from a remote music distribution platform or from a local storage medium. The remote music distribution platform could run on another server (not shown) connected to the network 16, or could be provided by/on the first device 12. Alternatively, the input audio data may be transmitted from the second device 14 to the first device 12.

At around the same time, the second device 14 starts downloading a second copy of input audio data as identified by the song identification data via network 16, from the same or a different remote music distribution platform or from a local storage medium or from the first device 12.

Furthermore, in step S4, the first device 12 generates intermediate data (a set of masks) for the selected song using the AI system of the intermediate data generating unit 24, and transmits the intermediate data back to the second device 14 in step S5. In step S6, the second device then combines the intermediate data received from the first device 12 with the input audio data retrieved in step S3 such as to obtain decomposed output data. Eventually the second device 12 plays playback audio data obtained by audio output unit 38 in step S7 and this part of the processing ends.

In a variant of the second embodiment, which is a modification of the second embodiment and will therefore only briefly be described with regard to its differences with respect to the second embodiment, the method as illustrated in FIG. 4 again allows a user to select a song in step 11 and transmits song identification data of the selected song to the first device 12 in step S12. However, in contrast to the second embodiment, in the present variant according to FIG. 4, the first device 12 does not start generating intermediate data using the AI system for the selected song, but rather reads out, in step S13, intermediate data corresponding to the song identification data of the selected song from the storage medium 25. Then, in steps S14 to S16, the processing is the same or corresponding to that of the second embodiment, i.e. in step S14 the intermediate data are transmitted from the first device 12 to the second device 14, in step S15 the second device downloads input audio data for the selected song from a music distribution platform, in step S16 the intermediate data and the input audio data are combined to obtain output audio data, and in step S17 the playback audio data obtained from the output audio data are played back.

FIG. 5 shows a system 110 according to a third embodiment of the present invention, which comprises an electronic device 111 connected to a network 116, such as the Internet, via a data communication interface 130 of the device 111. Device 111 may have a user communication interface 126 with functionality as described above for the user communication interface 26 of the first embodiment, for example a touch display. Furthermore, connected to the user communication interface 126, there may be provided a song selection unit 128 allowing a user to select a song as described above for the song selection unit 28 of the first embodiment.

Song identification data identifying the song or song position selected through the song selection unit 128 may then be forwarded to an intermediate data obtaining unit 132 which is connected to a storage medium 125 to read out a corresponding set of intermediate data associated with the song identification data. To this event, storage medium 125 stores a plurality of sets of intermediate data IMD1, IMD2, IMD3 etc. for a respective plurality of different songs or song positions identified by song identification data SID1, SID2, SID3, respectively.

The intermediate data obtained by intermediate data obtaining unit 132 for the selected song are then forwarded to an audio processing unit 136. In addition to the intermediate data, this audio processing unit 136 also receives input audio data of the selected song via an input audio unit 134 of the device 111. To this end the input audio unit 134 is connected to the song selection unit 128 to receive the song identification data of the selected song or song position, and is connected to the data communication interface 130 to download the input audio data of the selected song via network 116. In addition or as an alternative to the data communication interface 130, system 110 may comprise an audio data storage 137 which may store audio data of one or more songs. The input audio unit 134 may thus load input audio data of the selected song from the audio data storage 137. In particular, the system 110 may use downloading via network 116 only if the selected song is not stored on the audio data storage 137.

Based on the intermediate data and the input audio data of the selected song, the audio processing unit 136 is carrying out a processing (second processing) as described above with reference to audio processing unit 36 of the first embodiment, i.e. a point-wise multiplication of the timbre masks of the intermediate data with the corresponding time-frequency-spectrogram of the input data and then a back transformation of the results to the time domain to obtain the output audio data. The output data are then forwarded to an audio output unit 138, optionally processed, and converted to analog signals for playback through speakers 140, headphones or other PA equipment.

As can be understood from the description above, the operation of the system 110 of the third embodiment relies upon intermediate data stored within the storage medium 125. For establishing a database storing a sufficient number of sets of intermediate data in storage medium 125, device 111 further comprises an intermediate data generating unit 124 which may have the same features and functionality as the intermediate data generating unit 24 of the first embodiment described above with reference to FIG. 1. In particular, intermediate data generating unit 124 may comprise an AI system having one or more neural networks for identifying specific musical timbres contained in the input audio data and delivering intermediate data in the form of a set of respective masks for the musical timbres. Intermediate data generating unit 124 may then be operated to analyze input audio data of one or preferably a plurality of songs, to generate respective sets of intermediate data, and to store the sets of intermediate data in association with the song identification data of the respective songs or song positions within storage medium 125 for later retrieval by intermediate data obtaining unit 132. It should be noted that intermediate data generating unit 124 may be controlled by the user, for example through the song selection unit 128, to generate intermediate data for selected musical timbres.

An operation of the system 110 of the third embodiment will now be described with reference to FIG. 6, which outlines a method according to a fourth embodiment of the present invention.

The description of the process starts in step S21 when a user selects a song from a plurality of songs as described in the first and second embodiments above. In step S22, based on the song identification data of the selected song or song position, input audio unit 134 is operated to start downloading input audio data of the selected song from a music distribution platform or from a local storage. In parallel, in step S23, the intermediate data obtaining unit 132 may check whether intermediate data associated with the song identification data of the selected song or song position are stored within the storage medium 125 or not. If the answer in step S23 is YES, then intermediate data are read out from the storage medium 125 in step S24 and the process continues to step S26.

If the answer in step S23 is NO, then the system, in step 25, operates intermediate data generating unit 132 to generate intermediate data from an analysis of the input audio data. The intermediate data generated by the intermediate data generating unit 132 may then be stored within storage medium 125 in association with the song identification data such as to avoid having to generate the intermediate data again later, if intermediate data for the same song identification data are required. In other words, intermediate data are cached within storage medium 125. At the same time, the intermediate data generated by the intermediate data generating unit 132 may be forwarded to the intermediate data obtaining unit 132 or, alternatively directly to the audio processing unit 136, such that the process may continue to step S26.

In step S26, the intermediate data and the input audio data are combined to obtain output audio data, and in step S27 playback audio data obtained from the output audio data may be played back.

In this way, the method of the fourth embodiment may increase the efficiency of the processing of audio data within device 111 of the third embodiment, by storing intermediate data which have once been generated by the AI system of the intermediate data generating unit 124 in the storage medium 125, and using prestored intermediate data in case that they will be required again in the future.

More generally, the present invention further relates to processing audio data and addresses the object to provide a method, a system and/or a computer program which allow obtaining one or more processed output audio data from the input audio data while reducing the processing time and/or resources required. To solve this object, the present invention further provides the following items:

1. Method for processing audio data, comprising the steps of
providing song identification data identifying a particular song from among a plurality of songs or identifying a particular position within a song,
loading intermediate data associated with the song identification data from a storage medium or from a remote device,
obtaining input audio data representing audio signals of the song as identified by the song identification data,
combining the input audio data and the intermediate data with one another to obtain output audio data.

2. Method of item 1, wherein the intermediate data are loaded from a local storage medium, wherein the local storage medium stores a plurality of different sets of intermediate data, which are associated to different sets of song identification data, and wherein loading the intermediate data comprises selecting intermediate data according to the song identification data from among the plurality of sets of intermediate data.

3. Method of at least one of the preceding items, wherein obtaining the intermediate data comprises the steps of
transmitting the song identification data from a first electronic device to a second electronic device via data communication means,
providing, by the second electronic device, intermediate data which are specific for the song identification data,
transmitting the intermediate data from the second electronic device to the first electronic device.

4. Method of at least one of the preceding items, further comprising a step of playing back playback data obtained from the output audio data, wherein the step of combining the input audio data and the intermediate data with one another is carried out during playback of playback data and with a processing speed equal to or higher than the playback speed.

5. Method of at least one of the preceding items, wherein the intermediate data and the input audio data are processed in chunks, wherein a first chunk of intermediate data is combined with a first chunk of input audio data to obtain a first chunk of output audio data, and wherein a first chunk of playback data obtained from the first chunk of output data is played back before or at the same time as at least one of the following steps are performed:
  a second chunk of intermediate data is loaded,
  a second chunk of input audio data is obtained,
  a second chunk of input audio data is combined with a second chunk of intermediate data.

6. Method of at least one of the preceding items, wherein the intermediate data loaded from the storage medium or the remote device are obtainable as the result of a previous first processing using an artificial intelligence system which includes at least one neural network.

7. Method for processing audio data, preferably method of at least one of the preceding items, wherein the method comprises the following steps:
  providing song identification data identifying a particular song from among a plurality of songs or identifying a particular position within a song,
  obtaining input audio data representing audio signals of the song as identified by the song identification data,
  processing the input audio data by using an artificial intelligence system which includes at least one neural network, such as to obtain intermediate data which are specific for the song identification data, wherein the intermediate data are configured to obtain output audio data when combined with the input audio data,
  storing the intermediate data in association with the song identification data in a storage medium and/or transmitting the intermediate data in association with the song identification data to a remote device.

8. Method of item 7, wherein the intermediate data are processed in chunks, wherein a first chunk of input audio data is processed by using the artificial intelligence system such as to obtain a first chunk of intermediate data, wherein the first chunk of intermediate data is stored in the storage medium or is transmitted to the remote device before or at the same time as a second chunk of input audio data is processed within the artificial intelligence system.

9. Method of item 7 or item 8, wherein the intermediate data associated to the song identification data, and the audio data representing audio signals of the song as identified by the song identification data are included within the same data package, preferably the same audio file, such as to be stored and/or transmitted in a joint manner.

10. Method of at least one of items 7 to 9, further comprising the steps of:
  receiving the song identification data from the remote device,
  obtaining and processing the input audio data identified by the song identification data such as to obtain intermediate data associated with the song identification data, and
  transmitting the intermediate data to the remote device.

11. Method of at least one of items 7 to 10, further comprising the steps of:
  providing a plurality of sets of song identification data for different songs and/or different positions within a song,
  obtaining and processing input audio data for each of the sets of song identification data such as to obtain a respective plurality of sets of intermediate data,
  storing each set of intermediate data in association with its song identification data within the storage medium, respectively,
  receiving demand song identification data from the remote device,
  reading intermediate data associated with the demand song identifi-cation data from the storage medium, and
  transmitting the intermediate data associated with the demand song identification data to the remote device.

12. Method of at least one of the preceding items, wherein the intermediate data comprise at least a first mask storing a plurality of mask elements, each mask element being associated with a component of the input audio data.

13. Method of item 12, wherein each component of the input audio data refers to a particular frequency or frequency band at a particular point in time or within a particular time interval along the time axis of the input audio data.

14. Method of at least one of the preceding items, wherein the step of combining the input audio data and the intermediate data with one another comprises the steps of:
  applying a Short-Time Fourier transform operation of the input audio data to obtain Fourier transformed input audio data,
  combining the Fourier transformed input audio data with the intermediate data to obtain precursor output audio data,
  applying an inverse Short-Time Fourier transform operation to the precursor output audio data to obtain the output audio data.

15. Method of at least one of the preceding items, further comprising the steps of:
  generating the intermediate data by processing, using an artificial intelligence system, audio data representing audio signals of the song as identified by the song identification data,
  storing the generated intermediate data within a local storage medium, wherein obtaining the intermediate data comprises loading the intermediate data from the local storage medium.

16. Method of at least one of the preceding items, further comprising the steps of
  detecting whether a storage medium stores intermediate data associated to the song identification data,
  if the storage medium does not store intermediate data associated to the song identified by the song identification data, then carrying out the following steps:
    i. generating intermediate data by processing, using an artificial intelligence system, audio data representing audio signals of the song as identified by the song identification data,
    ii. storing the generated intermediate data within a local storage medium,
  if the storage medium does store intermediate data associated to the song identification data, then reading the intermediate data associated to the song identification data from the storage medium.

17. Method of at least one of items 1 to 16, wherein the output data correspond to audio data obtained from the input audio data through application of an audio effect processing, which includes application of at least one audio effect, wherein the audio effect is preferably at least one of an equalizer, an audio filter, a compression, a multiband compression and a limiting processing.

18. Method item 17, wherein the audio effect processing includes a set of audio effects, in particular mastering filters.

19. Computer program product configured to carry out, when run on at least one computer, a method according to any of items 1 to 18.

20. System configured to perform a method according to any of items 1 to 18.

21. System for processing audio data, comprising
  a song selection unit, configured to select a particular song from among a plurality of songs or a particular position within particular a song, and to provide song identification data identifying the selected song or the selected position within the song,
an intermediate data loading unit configured to load intermediate data associated with the song identification data from a storage medium or from a remote device,
an input audio unit configured to obtain input audio data representing audio signals of the song as identified by the song identification data,
an audio processing unit configured to combine the input audio data and the intermediate data with one another to obtain output audio data.

22. System of item 21, comprising at least one of a local storage medium storing the intermediate data and data communication means configured to receive the intermediate data from a remote device.

23. System for processing audio data, preferably system of item 21 or item 22, comprising:
a song selection unit, configured to select a particular song from among a plurality of songs or a particular position within a particular song, and to provide song identification data identifying the selected song or the selected position within the song,
an input audio unit configured to obtain input audio data representing audio signals of the song as identified by the song identification data,
an intermediate data generating unit comprising an artificial intelligence system which includes at least one neural network, wherein the intermediate data generating unit is configured to generate intermediate data which are specific for the song identification data, wherein the intermediate data are configured to obtain output audio data when combined with the input audio data, and
at least one of a storage medium configured to store the intermediate data in association with the song identification data, and data communication means configured to transmit the intermediate data to a remote device.

24. System of at least one of items 21 to 23, comprising a first electronic device,
a second electronic device,
data communication means for transmitting the song identification data from the second electronic device to the first electronic device, and for transmitting intermediate data which are specific for the song identification data from the first electronic device to the second electronic device.

25. System of item 24, wherein the first electronic device comprises
a first input audio unit, configured to obtain a first copy of the input audio data,
the intermediate data generating unit configured to generate the intermediate data, wherein the data communication means are configured to transmit the intermediate data generated by the intermediate data generating unit from the first device to the second device.

26. System of item 24 or item 25, wherein the second electronic device comprises
the song selection unit,
the intermediate data loading unit,
a second input audio unit, configured to obtain a second copy of the input audio data,
the audio processing unit, configured to combine the second copy of the input audio data and the intermediate data loaded by the intermediate data loading unit with one another to obtain the output audio data,
a playback unit configured to play playback data obtained from the output audio data.

27. System of at least one of items 21 to 26, comprising an electronic device which comprises the song selection unit, the intermediate data generating unit, the input audio unit, the audio processing unit, and a playback unit configured to play playback data obtained from the output audio data, where-in the intermediate data generating unit comprises
an artificial intelligence system configured to generate the intermediate data by processing audio data representing audio signals of the song as identified by the song identification data, and
a storage medium configured to store the generated intermediate data.

According to the items described above, the invention and its embodiments described above with respect to the claims and the Figures may be applied not only to source separation of audio data, i.e., to AI based generation of decomposed output audio data, but also to other resource intensive audio processing, such as application of audio effects or sets or audio effects, in particular mastering filters. A specific set of audio effects (including effect settings and parameters) may then be encoded as intermediate data and may be stored or transmitted between devices in association with the audio data or with song identification data. Application of audio effects, for example a complete masting of a song, may then be performed automatically, without the need of an audio engineer, and in a resource saving and/or fast manner by combining the intermediate data with the input audio data.

As a particular use case, music mastering is the last step in the process of music creating before publishing. Among other things, its purpose is to ensure the song fits in well with the majority of published music in terms of perceived loudness and tonal characteristics. Due to changes in popular tastes over decades and varying levels of aptitude and capability of involved engineers, a user might still be left with a library of already mastered music that still varies widely in terms of tonal characteristics, making a secondary mastering process, such as that proposed above, valuable to homogenize the library.

Thus, the invention may be used for automatic mastering, i.e., mastering which uses an AI system which determines, as intermediate data, parameters to be applied to a specific a mastering processing (such as compression, equalization, multiband compression and limiting). In a subsequent step of the automatic mastering, the original input audio data may then be combined with the mastering processing including the parameters, which is a relatively simple calculation and can be carried out even on low-performance devices. The parameters for the mastering processing then form intermediate data in the sense of the present disclosure, which are expensive to determine (through AI) but can be easily transmitted because they may have a small size or high compressibility and can be trivially applied to the input audio data at a later point in time, for example on a client device.

As an example for an AI based mastering processing, to which the present invention could be applied, reference is made to S. I. Mimilakis, K. Drossos, T. Virtanen, and G. Schuller, "Deep Neural Networks for Dynamic Range Compression in Mastering Applications,", Journal of the Audio Engineering Society, Paper 9539, May 26, 2016.

The invention claimed is:

1. A method for processing audio data, comprising:
   providing song identification data identifying a particular song from among a plurality of songs or identifying a particular position within a particular song;
   loading intermediate data associated with the song identification data from a storage medium or from a remote device;
   obtaining input audio data representing audio signals of the song as identified by the song identification data, wherein the audio signals comprise a mixture of different musical timbres, wherein the mixture of different musical timbres comprises at least a first musical timbre and a second musical timbre different from the first musical timbre; and
   combining the input audio data and the intermediate data with one another to obtain output audio data, wherein the output audio data represent audio signals of the first musical timbre separated from the second musical timbre.

2. The method of claim 1, wherein the intermediate data are loaded from a local storage medium, wherein the local storage medium stores a plurality of different sets of intermediate data, wherein the different sets of intermediate data are associated to different sets of song identification data, and wherein loading the intermediate data comprises selecting intermediate data according to the song identification data from among the plurality of sets of intermediate data.

3. The method of claim 1, wherein obtaining the intermediate data comprises:
   transmitting the song identification data from a first electronic device to a second electronic device via data communication means;
   providing, by the second electronic device, intermediate data specific for the song identification data; and
   transmitting the intermediate data from the second electronic device to the first electronic device.

4. The method of claim 1, further comprising playing back playback data obtained from the output audio data, wherein the step of combining the input audio data and the intermediate data with one another is carried out during playback of playback data and with a processing speed equal to or greater than the playback speed.

5. The method of claim 1, wherein the intermediate data and the input audio data are processed in chunks, wherein a first chunk of intermediate data is combined with a first chunk of input audio data to obtain a first chunk of output audio data; and wherein a first chunk of playback data obtained from the first chunk of output data is played back before or at the same time as at least one of the following steps are performed:
   a second chunk of intermediate data is loaded,
   a second chunk of input audio data is obtained, or
   a second chunk of input audio data is combined with a second chunk of intermediate data.

6. The method of claim 1, wherein the intermediate data loaded from the storage medium or the remote device are obtainable as a result of a previous first processing using an artificial intelligence (AI) system, the AI system including at least one neural network.

7. A method for processing audio data, comprising:
   providing song identification data identifying a particular song from among a plurality of songs or identifying a particular position within a particular song;
   obtaining input audio data representing audio signals of the song as identified by the song identification data, wherein the audio signals comprise a mixture of different musical timbres including at least a first musical timbre and a second musical timbre different from the first musical timbre;
   processing the input audio data by using an artificial intelligence (AI) system including at least one neural network to obtain intermediate data specific for the song identification data, wherein output data are obtainable from the intermediate data, the output audio data representing audio signals of the first musical timbre separated from the second musical timbre when combined with the input audio data; and
   outputting the intermediate data, wherein the outputting comprises at least one of:
   storing the intermediate data in association with the song identification data in a storage medium; or
   transmitting the intermediate data in association with the song identification data to a remote device.

8. The method of claim 7, wherein the intermediate data are processed in chunks, wherein a first chunk of input audio data is processed by using the AI system to obtain a first chunk of intermediate data, wherein the first chunk of intermediate data is stored in the storage medium or is transmitted to the remote device before or at the same time as a second chunk of input audio data is processed within the AI system.

9. The method of claim 7, wherein (i) the intermediate data associated to the song identification data, and (ii) the audio data representing audio signals of the song as identified by the song identification data are included within a same data package to be stored or transmitted in a joint manner.

10. The method of claim 7, further comprising:
    receiving the song identification data from the remote device;
    obtaining and processing the input audio data identified by the song identification data to obtain intermediate data associated with the song identification data; and
    transmitting the intermediate data to the remote device.

11. The method of claim 7, further comprising:
    providing a plurality of sets of song identification data for one or more of different songs or different positions within a song;
    obtaining and processing input audio data for each of the sets of song identification data such as to obtain a respective plurality of sets of intermediate data;
    storing each set of intermediate data in association with respective song identification data within the storage medium;
    receiving demand song identification data from the remote device;
    reading intermediate data associated with the demand song identification data from the storage medium; and
    transmitting the intermediate data associated with the demand song identification data to the remote device.

12. The method of claim 7, wherein the intermediate data comprise at least a first mask storing a plurality of mask elements, each mask element being associated with a component of the input audio data, wherein a combination of a particular mask element with its associated component of the input audio data indicates a presence of the first timbre in an audio signal associated with the component.

13. The method of claim 9, wherein each component of the input audio data refers to a particular frequency or frequency band at a particular point in time or within a particular time interval along a time axis of the input audio data.

14. The method of claim 7, wherein combining the input audio data and the intermediate data with one another comprises:
applying a Short-Time Fourier transform operation of the input audio data to obtain Fourier transformed input audio data;
combining the Fourier transformed input audio data with the intermediate data to obtain precursor output audio data; and
applying an inverse Short-Time Fourier transform operation to the precursor output audio data to obtain the output audio data.

15. The method of claim 7, further comprising:
generating the intermediate data by processing, using the AI system, audio data representing audio signals of the song as identified by the song identification data, wherein the audio signals contain a mixture of different musical timbres, including at least the first musical timbre and the second musical timbre; and
storing the generated intermediate data within a local storage medium,
wherein obtaining the intermediate data comprises loading the intermediate data from the local storage medium.

16. The method of claim 7, further comprising:
detecting whether a storage medium stores intermediate data associated to the song identification data,
responsive to detecting that the storage medium does not store intermediate data associated to the song identified by the song identification data:
generating intermediate data by processing, using the AI system, audio data representing audio signals of the song as identified by the song identification data, wherein the audio signals contain a mixture of different musical timbres, including at least the first musical timbre and the second musical timbre; and
storing the generated intermediate data within a local storage medium; and
responsive to detecting that the storage medium does store intermediate data associated to the song identification data, reading the intermediate data associated to the song identification data from the storage medium.

17. The method of claim 9, wherein the same data package comprises a same audio file.

18. A computer program product comprising a nontransitory computer-readable storage medium, the non-transitory computer-readable storage medium storing computer-readable program instructions that, when executed by at least one computer, cause the at least one computer to perform operations comprising:
providing song identification data identifying a particular song from among a plurality of songs or identifying a particular position within a particular song;
loading intermediate data associated with the song identification data from a storage medium or from a remote device;
obtaining input audio data representing audio signals of the song as identified by the song identification data, wherein the audio signals comprise a mixture of different musical timbres, wherein the mixture of different musical timbres comprises at least a first musical timbre and a second musical timbre different from the first musical timbre; and
combining the input audio data and the intermediate data with one another to obtain output audio data, wherein the output audio data represent audio signals of the first musical timbre separated from the second musical timbre.

19. A system for processing audio data, comprising:
a song selection unit configured to select a particular song from among a plurality of songs or a particular position within a particular song, and to provide song identification data identifying the selected song or the selected position within the song;
an intermediate data loading unit configured to load intermediate data associated with the song identification data from a storage medium or from a remote device;
an input audio unit configured to obtain input audio data representing audio signals of the song as identified by the song identification data, wherein the audio signals comprise a mixture of different musical timbres including at least a first musical timbre and a second musical timbre different from said first musical timbre; and
an audio processing unit configured to combine the input audio data and the intermediate data with one another to obtain output audio data, wherein the output audio data represent audio signals of the first musical timbre separated from the second musical timbre.

20. The system of claim 19, further comprising at least one of a local storage medium storing the intermediate data or data communication means configured to receive the intermediate data from a remote device.

21. The system of claim 19, further comprising:
an intermediate data generating unit comprising an artificial intelligence (AI) system including at least one neural network, wherein the intermediate data generating unit is configured to generate intermediate data which are specific for the song identification data, wherein the intermediate data are configured to obtain output audio data representing audio signals of the first musical timbre separated from the second musical timbre when combined with the input audio data; and
at least one of:
a storage medium configured to store the intermediate data in association with the song identification data; or
data communication means configured to transmit the intermediate data to a remote device.

22. The system of claim 19, further comprising
a first electronic device,
a second electronic device,
data communication means for transmitting the song identification data from the second electronic device to the first electronic device, and for transmitting intermediate data which are specific for the song identification data from the first electronic device to the second electronic device.

23. The system of claim 22, wherein the first electronic device comprises:
a first input audio unit configured to obtain a first copy of the input audio data; and
the intermediate data generating unit configured to generate the intermediate data,
wherein the data communication means are configured to transmit the intermediate data generated by the intermediate data generating unit from the first device to the second device.

24. The system of claim 22, wherein the second electronic device comprises
- the song selection unit;
- the intermediate data loading unit;
- a second input audio unit configured to obtain a second copy of the input audio data;
- the audio processing unit, the audio processing unit being configured to combine the second copy of the input audio data and the intermediate data loaded by the intermediate data loading unit with one another to obtain the output audio data; and
- a playback unit configured to play playback data obtained from the output audio data.

25. The system of claim 19, further comprising an electronic device comprising the song selection unit, the intermediate data generating unit, the input audio unit, the audio processing unit, and a playback unit configured to play playback data obtained from the output audio data, wherein the intermediate data generating unit comprises:
- an artificial intelligence (AI) system configured to generate the intermediate data by processing audio data representing audio signals of the song as identified by the song identification data, wherein the audio signals contain a mixture of different musical timbres, including at least the first musical timbre and the second musical timbre; and
- a storage medium configured to store the generated intermediate data.

26. The system of claim 19, further comprising:
- a mixing unit for mixing first audio data at a first volume level with second audio data at a second volume level to obtain third audio data, wherein the first audio data are obtained from the input audio data; and
- a playback unit for playing back playback data obtained from the third audio data.

27. The system of claim 26, further comprising a user control unit including at least one control element configured for accepting a user input for controlling at least one of:
- a ratio or relation between the first volume level and the second volume level,
- the first volume level independently from the second volume level, or
- the second volume level independently from the first volume level.

* * * * *